United States Patent [19]

Ritter et al.

[11] Patent Number: 5,933,699
[45] Date of Patent: Aug. 3, 1999

[54] METHOD OF MAKING DOUBLE-WALLED TURBINE COMPONENTS FROM PRE-CONSOLIDATED ASSEMBLIES

[75] Inventors: Ann Melinda Ritter, Albany; Melvin Robert Jackson, Niskayuna; Nesim Abuaf, Schenectady; Robert Patrick Campbell, Loudonville; Ronald Scott Bunker, Niskayuna, all of N.Y.

[73] Assignee: General Electric Company, Schenectady, N.Y.

[21] Appl. No.: 08/669,070

[22] Filed: Jun. 24, 1996

[51] Int. Cl.⁶ ............................... B22F 7/02; B22F 7/06
[52] U.S. Cl. .................... 419/6; 419/28; 419/49; 419/55
[58] Field of Search .................. 419/49, 6, 28, 419/55

[56] References Cited

U.S. PATENT DOCUMENTS

| | | | |
|---|---|---|---|
| 3,999,416 | 12/1976 | Brooks | 72/69 |
| 5,226,982 | 7/1993 | Eylon | 148/522 |
| 5,253,478 | 10/1993 | Thibault, Jr. et al. | 60/733 |
| 5,269,050 | 12/1993 | Wiggs et al. | 29/889.72 |
| 5,328,331 | 7/1994 | Bunker et al. | 416/96 R |
| 5,427,736 | 6/1995 | Ritter et al. | 419/48 |
| 5,460,002 | 10/1995 | Correa | 60/723 |
| 5,480,468 | 1/1996 | Ritter et al. | 75/228 |
| 5,724,816 | 3/1998 | Ritter et al. | 60/752 |

FOREIGN PATENT DOCUMENTS

| | | |
|---|---|---|
| 0486133 | 5/1992 | European Pat. Off. . |
| 801210 | 10/1997 | European Pat. Off. . |
| 2038152 | 3/1970 | France . |
| 2477445 | 3/1980 | France . |
| 4343332 | 6/1995 | Germany . |
| 1503921 | 12/1975 | United Kingdom . |

Primary Examiner—Daniel J. Jenkins
Attorney, Agent, or Firm—Noreen C. Johnson; Douglas E. Stoner

[57] ABSTRACT

Methods of making gas turbine structures with cooling channels, such as, for example, combustor/transition pieces for gas turbines having a double wall with a plurality of cooling channels, having axially and/or circumferential cross-flow passages positioned between the structure's inner member and the outer member to provide cooling air thereto, are disclosed. A representative method of producing such annular structures having a hot and a cold wall, and joining ribs, for the inner and the outer components of an annulus, such as for jet engine turbine combustors, to net shape as an annular pre-form includes: forming a pre-form assembly including materials for the hot wall, cold wall, and ribs and sacrificial segments for maintaining cooling channels during forming of the pre-assembly and later processing; rolling the pre-form to a required thickness and length as a flat pre-form; hoop-rolling the preform to a required thickness and a required length; welding the assembly; ring rolling to the pre-form to a desired inner diameter; ring-rolling or metal spinning the pre-form to produce the proper wall contour and removing the sacrificial material to open the cooling channels.

17 Claims, 6 Drawing Sheets

METHOD OF MAKING DOUBLE-WALLED TURBINE COMPONENTS FROM PRE-CONSOLIDATED ASSEMBLIES

RELATED APPLICATIONS

This application is related to commonly assigned U.S. Pat. of Ritter et al., U.S. Pat. No. 5,724,816, of Jackson et al. and U.S. Pat. No. 5,822,853 application Ser. No. 60/019,503, filed Jun. 10, 1996, now abandoned, the disclosure of each is herein incorporated by reference.

BACKGROUND OF THE INVENTION

This invention relates generally to methods of making gas turbine components and more particularly relates to methods of making improved combustors and/or transition pieces for utilization in gas turbines where film cooling may be extremely limited or might not even be possible.

Traditional gas turbine combustors use diffusion (i.e., nonpremixed) flames in which fuel and air enter the combustion chamber separately. The process of mixing and burning produces flame temperatures exceeding 3900 degrees F. Since conventional combustors and/or transition pieces having liners are generally capable of withstanding for about ten thousand hours (10,000) a maximum temperature on the order of only about 1500 degrees F., steps to protect the combustor and/or transition piece liners must be taken. This has typically been done by film-cooling which involves introducing the relatively cool compressor air into a plenum surrounding the outside of the combustor. In this prior arrangement, the air from the plenum passes through louvers in the combustor liner and then passes as a film over the inner surface of the combustor liner, thereby maintaining combustor liner integrity.

Because diatomic nitrogen rapidly disassociates at temperatures exceeding about 3000° F. (about 1650° C.), the high temperatures of diffusion combustion result in relatively large $NO_x$ emissions. One approach to reducing NOx emissions has been to premix the maximum possible amount of compressor air with fuel. The resulting lean premixed combustion produces cooler flame temperatures and thus lower NOx emissions. Although lean premixed combustion is cooler than diffusion combustion, the flame temperature is still too hot for prior conventional combustor liners to withstand.

Furthermore, because the advanced combustors premix the maximum possible amount of air with the fuel for NOx reduction, little or no cooling air is available making film-cooling of the combustor liner impossible. Thus, means such as thermal barrier coating in conjunction with "backside" cooling have been considered to protect the combustor liner from destruction by such high heat. Backside cooling involved passing the compressor air over the outer surface of the combustor liner prior to premixing the air with the fuel.

Lean premixed combustion reduces $NO_x$ emissions by producing lower flame temperatures. However, the lower temperatures, particularly along the inner surface or wall of the combustor liner, tend to quench oxidation of carbon monoxide and unburned hydrocarbons and lead to unacceptable emissions of these species. To oxidize carbon monoxide and unburned hydrocarbons, a liner would require a thermal barrier coating of extreme thickness (50–100 mils) so that the surface temperature could be high enough to ensure complete burnout of carbon monoxide and unburned hydrocarbons. This would be approximately 1800–2000 degrees F. bond coat temperature and approximately 2200 degrees F. TBC (Thermal Barrier Coating) temperature for combustors of typical lengths and flow conditions. However, such thermal barrier coating thicknesses and temperatures for typical gas turbine component lifetimes are beyond current materials known capabilities. Known thermal barrier coatings degrade in unacceptably short times at these temperatures and such thick coatings are susceptible to spallation.

Advanced cooling concepts now under development require the fabrication of complicated cooling channels in thin-walled structures. The more complex these structures are, the more difficult they are to make using conventional techniques, such as casting. Because these structures have complexity and wall dimensions that may be beyond the castability range of advanced superalloys, and which may exceed the capabilities of the fragile ceramic cores used in casting, both in terms of breakage and distortion, new methods of fabricating must be developed to overcome these prior limitations. Possible geometries for enhanced cooling are disclosed in Docket No. 51DV5608PA, the disclosure of which is incorporated herein by reference.

Because the accuracy of placement of cooling features and wall thicknesses is much greater than for ceramic-cored castings, the powder foil process, described in U.S. Pat. Nos. 5,427,736 and 5,480,468, the disclosure of each is herein incorporated by reference, may provide for greatly reduced tolerances on wall thicknesses. These capabilities are also of interest in fabricating components other than airfoils, such as combustors, which can be cylindrical, and more irregularly shaped components such as transition pieces. In those kinds of structures, wrought alloys may be used, with considerable brazing and/or welding of cooling features (such as impingement sleeves) being required. Accuracy of placement of such cooling features, and retention of mechanical behavior of strong superalloys and avoidance of structural damage during welding, may be a severe limitation to materials that can be considered.

More efficient cooling structures may allow significant cooling flow reduction, perhaps up to 60%, without increasing the metal temperature. These reductions may also be realized with a combination of new cooling structures and other system/cycle changes.

Accordingly, there is a need for new and improved methods of making gas turbine components, such as, for example, combustors/transition pieces which can withstand combustion temperatures without film-cooling and yet maintain flame stability and burn out carbon monoxide and unburned hydrocarbons, such as advanced cooling concepts for low-emissions-combustors and transition pieces (particularly $NO_x$ emissions). Such methods should produce combustor/transition pieces having cooling channels in thin-walled structures which allow the inner surface of the combustor/transition piece to maintain reasonable metal temperatures. Efficient cooling combustor/transition piece structures should provide cooling flow reduction of about thirty-five percent (35%) to about sixty percent (60%) without increasing the metal temperature of the inner surface of the combustor and should have internal features such as turbulation promoters which must have sharper internal edges than can be currently produced by casting. Because the accuracy of placement of cooling features and wall thicknesses can be much greater than for ceramic-cored castings, utilizing a powder foil process should provide for greatly reduced tolerances on wall thicknesses, and should also provide for the production of sharp-edged internal features. These capabilities could also be used in fabricating components, such as combustors, which can be cylindrical, and more irregularly shaped components such as transition pieces. In those kinds of structures, wrought alloys might be used, with considerable brazing and/or welding of cooling features (such as impingement sleeves) being required. Accuracy of placement of such cooling features, and retention of mechanical behavior of strong superalloys and avoidance of structural damage during welding, may be a severe limitation to materials that can be considered.

BRIEF DESCRIPTION OF THE INVENTION

Combustors, transition pieces and other turbine structures for which film cooling may not be an option, are produced with double-walled cooling channels by metalworking of pre-consolidated assemblies. Cylindrical and conical rings, or more complex-geometry transition pieces with complex internal cooling channels running circumferentially are produced by hot-rolling of a HIP preform, followed by cold ring-rolling, welding, and chemical removal of sacrificial materials used to maintain the cooling channel locations during metal deformation.

Other objects and advantages of the present invention will become apparent from the following description, the accompanying drawings and the appended claims.

DETAILED DESCRIPTION OF THE INVENTION

Figure 1:
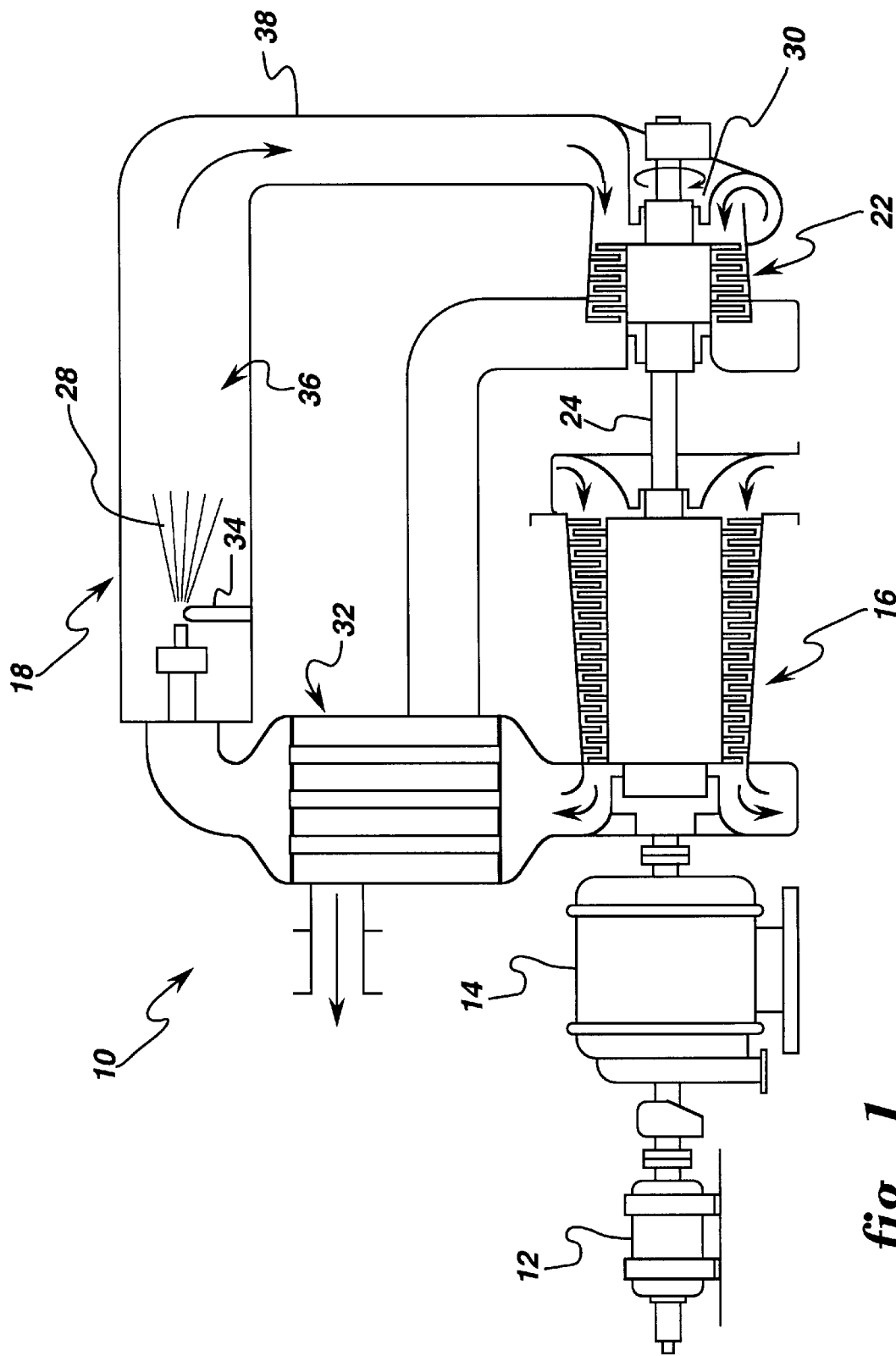
FIG. 1 is a schematic representation of a representative gas turbine.

FIG. 1 schematically illustrates a gas turbine system 10. In operation, typical gas turbines 10 are driven by the combustion gases from fuels, in that a flowing medium with a high energy content, i.e., the combustion gases, produces a rotary motion as a result of being deflected by rings of blading mounted on a rotor. In operation, the compressor 16 draws in fresh air and compresses it to a representative pressure on the order of about 50–75 lb/in$^2$; the air is forced by the compressor 16 through a heat exchanger 32 where it is preheated by the heat that is still present in the exhaust combustion gases emerging from the turbine section 22; and finally, the preheated air is admitted into the combustion chamber of the combustion section 18. In the combustion chamber, fuel is burned, thereby producing gases with a temperature of about 1500° C. or about 2730° F. These combustion gases flow at a high velocity into turbine section 22 and drive it.

As shown, the turbine 22 itself, the compressor 16 and the electric generator 14 are all mounted on a single shaft 24. As is well known, the turbine cannot transmit its entire power output to the generator, for a substantial portion is needed for driving the compressor 16. The turbine section 22 is started with the aid of the electric motor 12 which first has to set the compressor in motion in order to produce compressed air and supply it to the combustion chamber so as to enable the combustion gases to be formed. Only then can the turbine start running.

As schematically shown in FIG. 1, the combustion section 18, which includes the combustion chamber 36 provides for the flow of the combustion gas 28 from the combustion section 18 to the turbine inlet 30. A transition piece 38 connects the turbine inlet and the combustion section 18.

In the construction of combustors or combustor sections and transition pieces, where the temperature of the combustion gases is about or exceeds about 1500° C., there are no known materials which can survive such a high intensity heat environment without some form of cooling.

As stated in the background of the invention, the cooling of the various components of a gas turbine coupled with the requirement to reduce the NOx emissions has led to the development of new manufacturing methods for the fabrication of various gas turbine components. In accordance with the present invention, methods for making double walled turbine component from preconsolidated assemblies, such as the turbined component shown in FIG. 2, have been developed.

Figure 2:
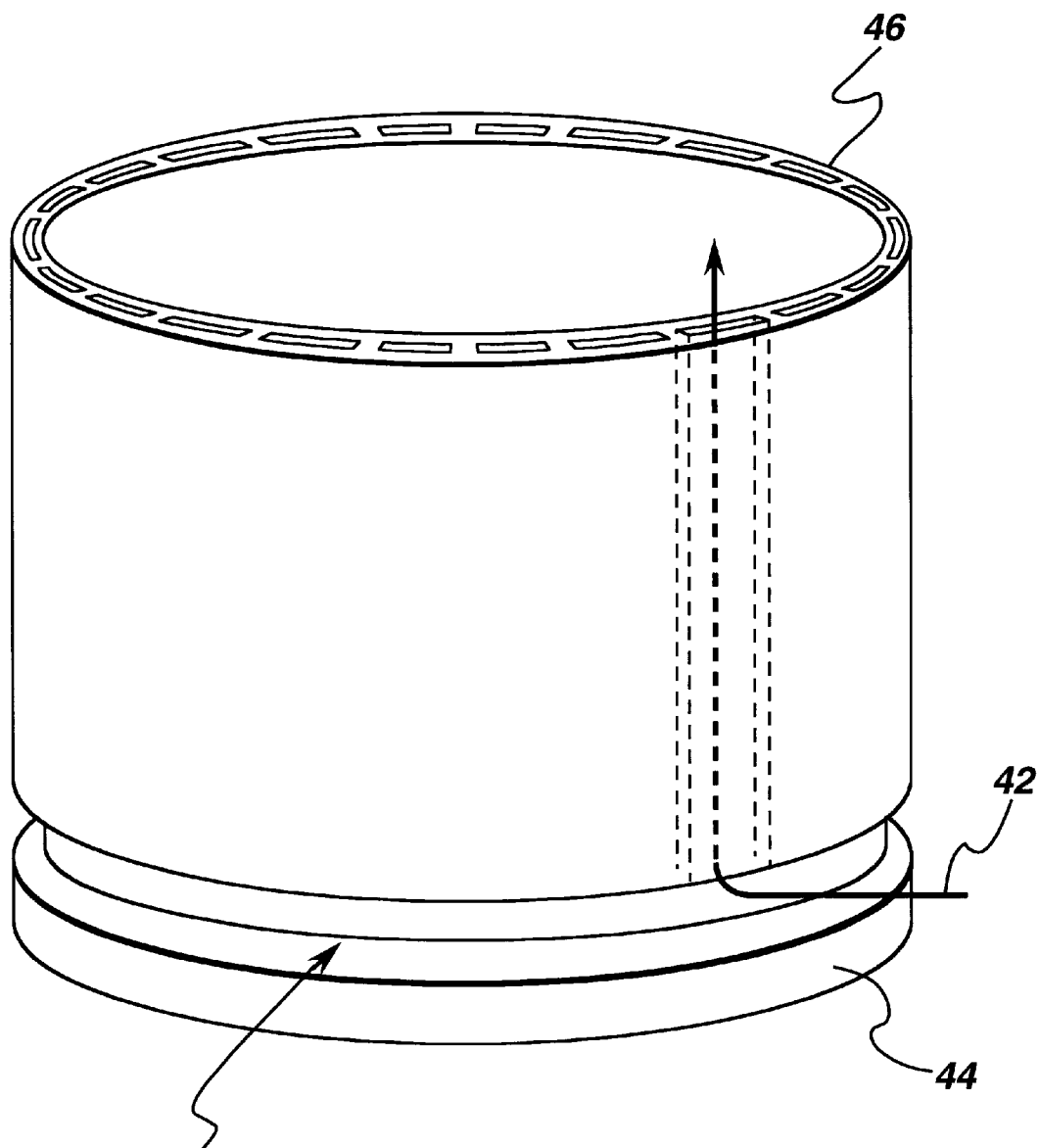
FIG. 2 is a perspective view of an axially cooled cylindrical structure produced in accordance with the present invention.

FIG. 2 shows a combustor 40 with an axially arranged cooling scheme, where cooling air 42 enters at the exhaust end 44 of the combustor and flows back to the dome-end 46 to be mixed and burned with the fuel. This type structure can be produced as a pre-form for rolling to required thickness and length, and then welding the assembly (similar to processes described below for circumferentially cooled structure), or it can be produced by being HIPed to a cylindrical shape, followed by ring rolling to the desired inner diameter. The structure produced was made of a Ni-base superalloy, Haynes 230. However, depending on temperatures of individual applications, materials could be used including stainless steels, alloys and composites with a Ni-base, Co-base, Fe-base, Ti-base, Cr-base, or Nb-base. An example of a composite is a FeCrAlY metallic matrix reinforced with a W phase, present as particulate, fiber, or laminate. The materials used in the hot wall and cold wall are not required to be the same alloy.

Figure 3:
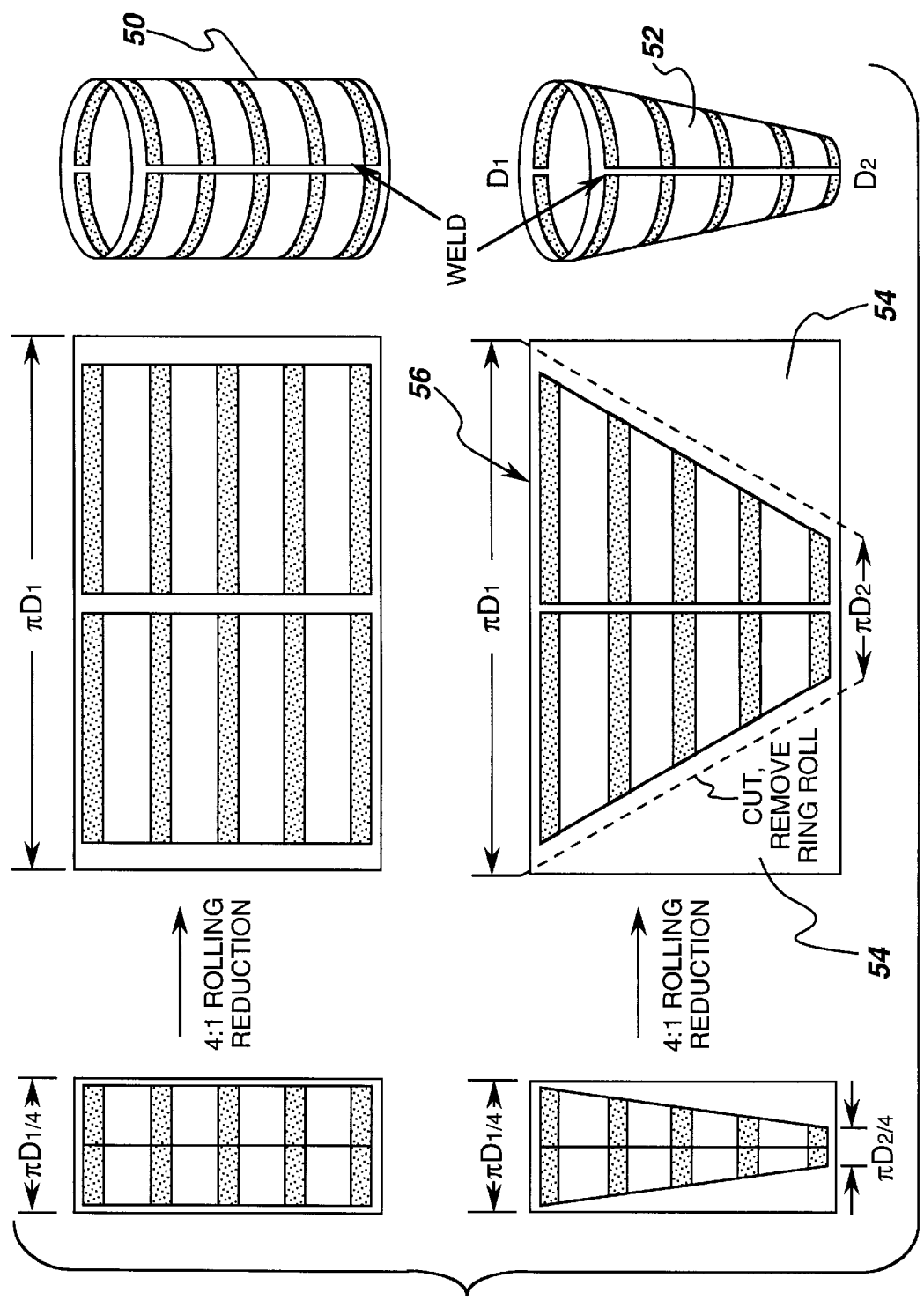
FIG. 3 is a schematic illustration of one method of the present invention using a consolidated assembly rolled and ring rolled for combustor fabrication in accordance with one method of the present invention.
Figure 4:
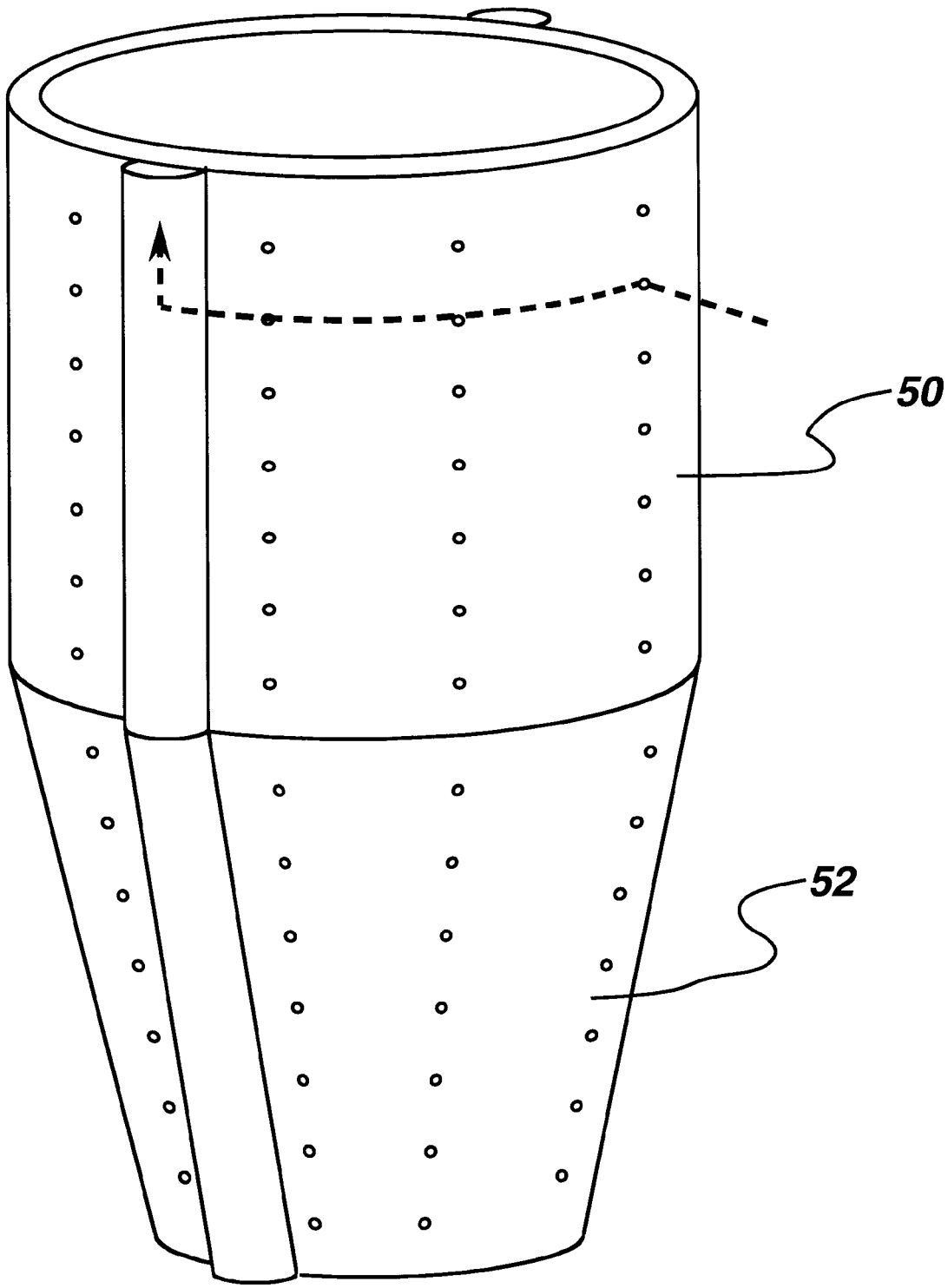
FIG. 4 is a schematic illustration of an assembled circumferentially cooled combustor made in accordance with one method of the present invention.

FIG. 3 shows a schematic illustration of fabrication of a circumferentially cooled structure, for both cylindrical 50 and conical 52 portions of structure, such as combustors and transition pieces. After consolidation of the pre-forms, including the sacrificial strips whose eventual removal will produce cooling channels, the pre-forms are hot rolled to reduce the section dimensions (4:1 reduction in the example of FIG. 3). For the right cylindrical portion 50 of the combustor, the rolled section 52 is then ring rolled. For the conical section of the combustor, the excess material 54 of the rolled structure 56 is cut away, and the remaining section is ring rolled to form the cone 52. The edges of these sections are solid material, on the order of about $\frac{1}{16}$–$\frac{1}{8}$ inches, so that each cylinder 50, 52 can be welded together axially, and the cylindrical and conical sections can be joined circumferentially, as shown in FIG. 4.

These structures can be made using different materials, such as stainless steels, alloys and composites with a Ni-base, Co-base, Fe-base, Ti-base, Cr-base, or Nb-base. An example of a composite is a FeCrAlY metallic matrix reinforced with a W phase, present as particulate, fiber, or laminate. The materials used in the hot wall and cold wall are not required to be the same alloy. Since foils of high-strength superalloys may not be available, the top and bottom faces of the preform can be made using superalloy powders, such as powders of composition equivalent to Rene 80, Rene N4, Rene N5, Rene 142, Haynes 214, Hayne 230, or MCrAlY materials, such as NiCoCrAlY. Depending on the types of materials used, the structures can be ring-rolled hot, instead of cold rolled.

Figure 5:
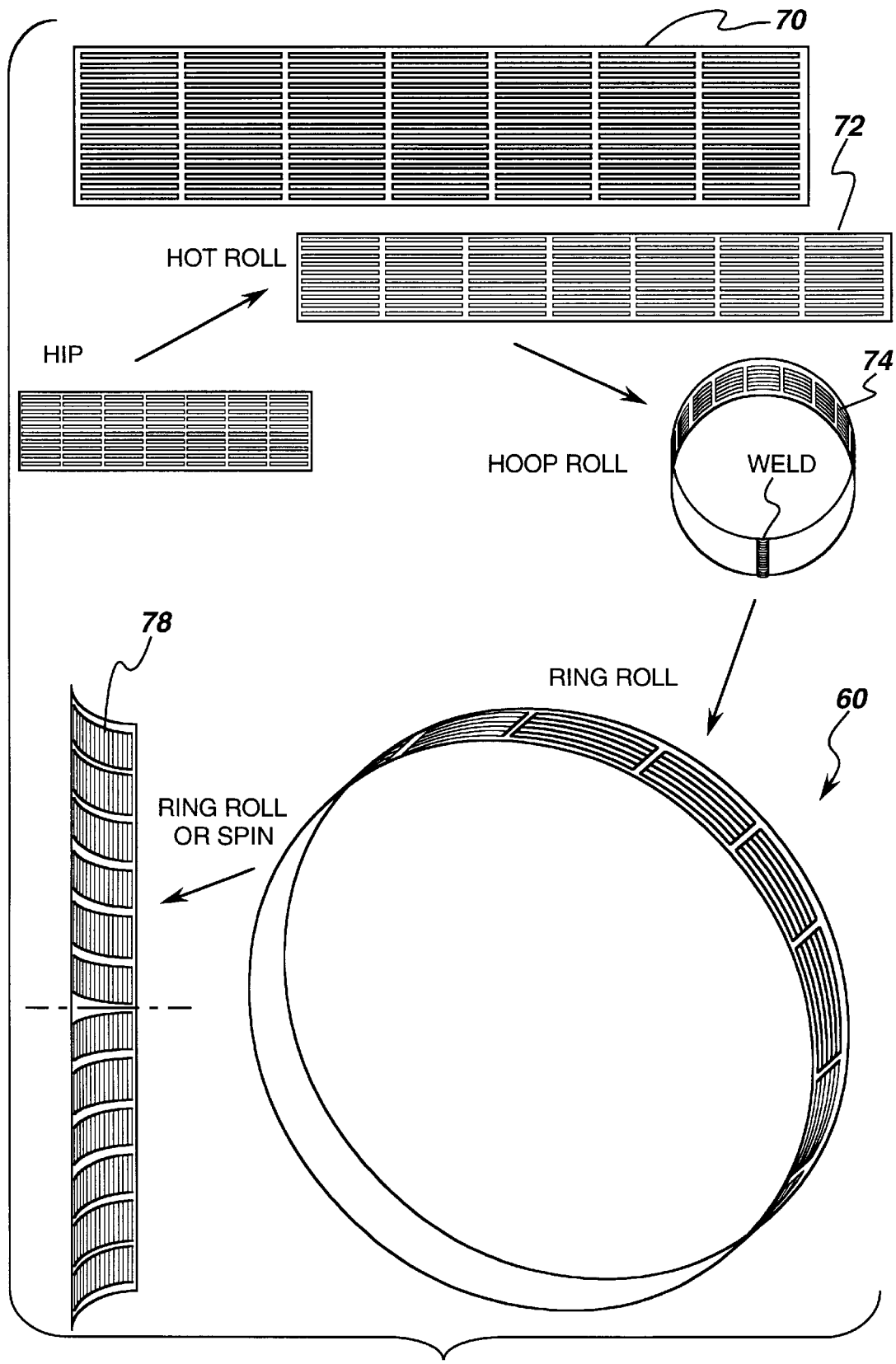
FIG. 5 is a schematic illustration of the manufacturing steps for the outer annulus of a jet engine combustor made in accordance with one method of the present invention.

Structures of annular combustors commonly in use in jet engines, made as double-wall structures with cooling channels running either axially or circumferencially, can also be produced by the methods of the present invention. FIG. 5 shows a combustor 60 with a circumferentially arranged cooling scheme, where cooling air enters through impingement holes in the cold wall of the double-wall structure of the combustor and flows through collector tubes (not shown) to the dome-end to be mixed and burned with the fuel. Both the inner annulus and the outer annulus of the combustor can be produced in this way. Some of the air can be used to form a surface film if needed, using cooling features such as holes-in-slots (FIG. 6) illustrating an axially cooled structure.

These annular structures can be produced to net shape, as an annular pre-form for rolling to required thickness and length, and as a flat pre-form for rolling to required thickness and length and then hoop-rolling and welding the assembly, followed by ring rolling to the desired inner diameter, and finally to ring-roll or metal spinning to produce the proper combustor wall contour. Depending on temperatures of individual applications, materials could be used including stainless steels, alloys and composites with a Ni-base, Co-base, Fe-base, Ti-base, Cr-base, or Nb-base. An example of a composite is a FeCrAlY metallic matrix reinforced with a W phase, present as particulate, fiber, or laminate. The materials used in the hot wall and cold wall are not required to be the same alloy. For example, a cold wall made of a stainless steel or Ni-base superalloy could be coupled with a hot wall made of a lower-expansion Ni-base superalloy, so that in service, thermal stresses would be reduced compared to a monolithic hot wall/cold wall structure.

FIG. 5 is a schematic illustration of fabrication of a circumferentially cooled structure. After consolidation of the pre-forms 70, including the sacrificial strips whose eventual removal will produce cooling channels, the description of the methods for forming cylindrical cooling channels is provided in Docket RD-23,635, Methods of Making Cylindrical Structures with Cooling Channels, the pre-forms are hot rolled 72 to reduce the section dimensions The edges of these sections are solid material, on the order of about $1/16$–$1/8$ inches, so that each annulus can be joined to other components in the structure.

The manufacturing steps of an annular combustor involve production of a single-piece ribbed hot wall and a cold wall joined to the hot wall to form and enclose the cooling channels. The cold wall can be made integral with the hot wall if needed, but such makes removal of the sacrificial material more difficult. For the hot wall, a pre-form assembly is produced, canned, evacuated, and HIPed. The pre-form has channels machined into it which are then filled with a sacrificial material, such as cold-rolled steel or monel.

Alternately, this assembly can consist of strips of steel and the combustor alloy arranged on a sheet of the combustor alloy. Different alloys could be used for the hot face and the rib if desired. For example, a rib structure made of a stainless steel or Ni-base superalloy could be coupled with a hot wall made of a lower-expansion Ni-base superalloy, so that in service, thermal stresses would be reduced compared to a monolithic hot wall/rib structure. The about two (2) feet long assembly is then canned and evacuated in a cold-rolled steel box and then HIPed. Typical HIP conditions for Fe-base, Ni-base, and Co-base structures are 1150 to 1250 degrees C. for 4–6 hours in 15–30 ksi argon; for more refractory alloy structures, such as Nb-base structures, higher HIP temperatures may prove useful, but interactions of the HIP can and any sacrificial components with the final structure must be avoided.

The assembly shown in FIG. 5 is schematic, since there would be about twenty (20) sets of channels around a final combustor circumference, rather than the seven (7) sets shown. If the cold wall needs to be integral, it would be included in the assembly prior to HIPing. After consolidation, the canned assembly is hot-rolled to approximately four (4) feet in length, and is then hoop-rolled and welded into a cylinder 74. This about fifteen (15) inch diameter cylinder 74 is then ring-rolled to the desired final diameter, and then is either spun or ring rolled to the required flared shape of the inner or outer annulus cross-sections 76. The pieces are then de-canned and etched to remove all the sacrificial material, exposing the channel shape. Depending on temperatures of individual applications, materials could be used including stainless steels, alloys and composites with a Ni-base, Co-base, Fe-base, Ti-base, Cr-base, or Nb-base. An example of a composite is a FeCrAlY metallic matrix reinforced with a W phase, present as particulate, fiber, or laminate. As noted above, the materials used in the construction are not required to be the same alloy for a components of the structure. For hot rolling of the canned assembly after HIP consolidation, temperatures of 900 to 1200 degrees C. may be used, with area reductions per rolling pass of about 10%. Hoop rolling most commonly would be performed at room temperature, since strains generated during such shaping are very small. Ring-rolling and spinning may be performed cold if the hoop-rolled and welded structure is dimensionally close to the final structure. More commonly, greater shaping deformation will be required than can be accomplished in cold working, so that spinning and/or ring rolling may require temperatures of 500 to 1200 degrees C., depending on the intricacy of the wall profile.

If the cold wall is integral, the impingement holes will be drilled prior to etching. If the structure does not need to be integral, etching of the sacrificial material is easier, and the cold wall and collector tubes are joined to the single-piece annulus after etching is complete. A separate cold wall also allows access to the back side of the hot wall channels so that enhanced impingement features can be added to that surface.

These structures can be made using different materials, such as stainless steels, alloys and composites with a Ni-base, Co-base, Fe-base, Ti-base, Cr-base, or Nb-base. Since foils of high-strength superalloys may not be available, the top and bottom faces of the preform can be made using superalloy powders, such as powders of composition equivalent to Rene 80, Rene N4, Rene N5, Rene 142, Haynes 214, Hayne 230, or MCrAlY materials, such as NiCoCrAlY. Depending on the types of materials used, the structures can be ring-rolled hot, instead of cold rolled. Single crystal alloys could be incorporated into hot walls if the structures are made net-shape by HIP consolidation. Typical HIP conditions for producing such Ni-base single crystal structures are 1150 to 1250 degrees C. for 4–6 hours in 15–30 ksi argon.

Figure 6:
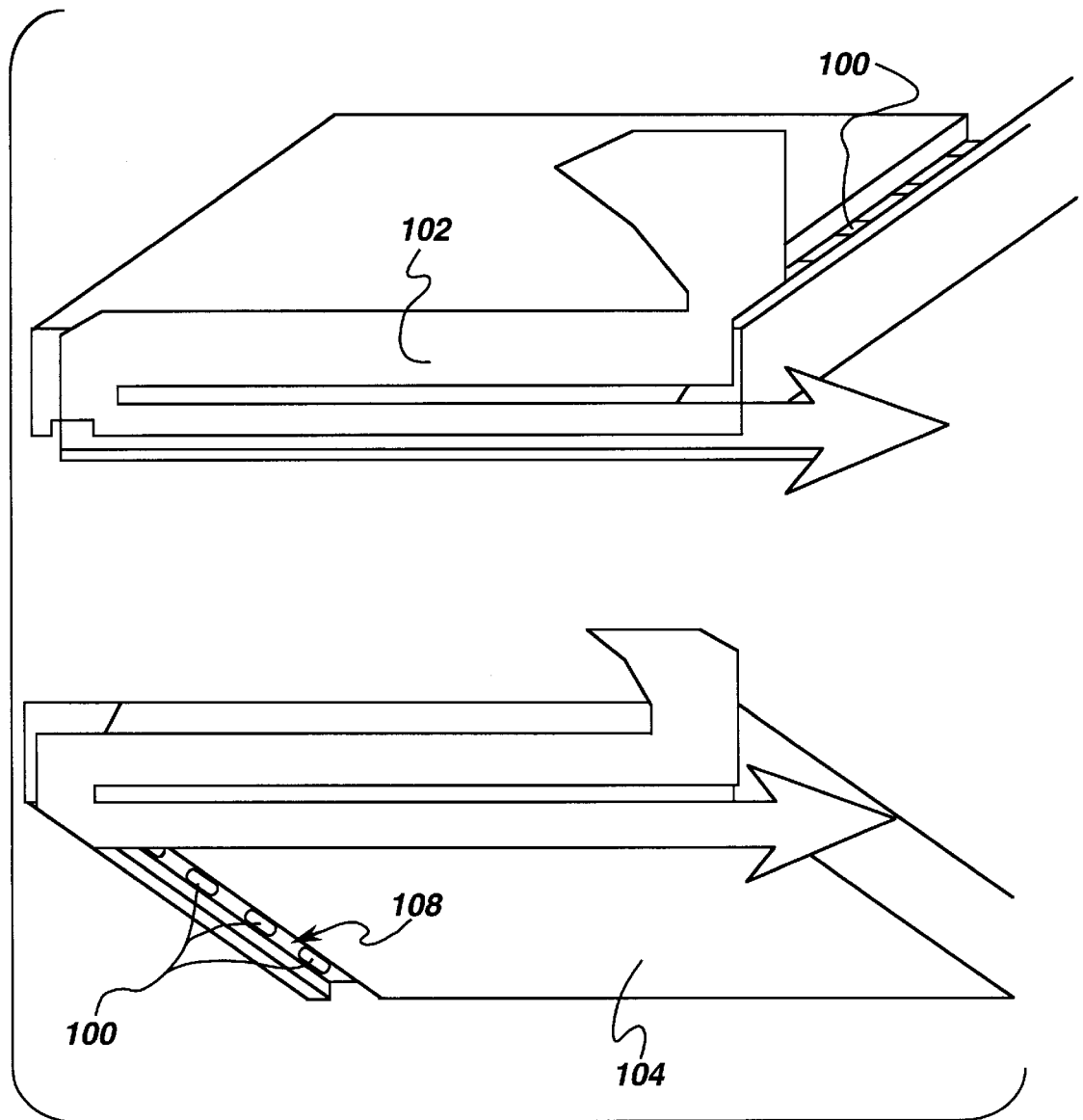
FIG. 6 is a partial section of annular axially cooled combustor wall with film cooling by holes-in-slots made in accordance with one method of the present invention.

A partial section of an annular axially cooled combustor wall with film cooling by holes-in-slots is shown in FIG. 6. Similar holes-in-slots configurations could be used in cylindrical can combustors as well. The assembly of such cooled structures by the methods described above requires only the addition of a sacrificial component where the cooling slot is to be located in the final structure. The cooling holes can be drilled subsequent to etch removal of the sacrificial components. As shown, cool air enters the cooling channel through the cold wall at 100, travels through channel 102 to cool the inner hot-gas-side wall 104 and then exits through a plurality of holes 106 inside a slot 108 in the inner wall 104. As it exits, it forms a film of cool air to further protect inner wall 104 from the combustion gases. The size and shape of the slot 108 can be controlled to maximize the retention of the cooling film on the surface. This is opposed to cooling holes that exit immediately through the outer surface which tend to allow the cooling air to partially penetrate the combustion gas stream and lose any further film cooling of that portion of the cooling air. The details of the usefulness of such holes-in-slots configurations are the subject of other patent applications.

While the methods contained herein constitute preferred embodiments of the invention, it is to be understood that the invention is not limited to these precise methods, and that changes may be made therein without departing from the scope of the invention which is defined in the appended claims.

What is claimed is:

1. A method for making double-wall turbine structures from pre-consolidated assemblies, comprising the steps of:
   forming a pre-form assembly including sacrificial materials;
   rolling the pre-form to a predetermined length and thickness;
   removing the sacrificial materials; and
   welding the rolled pre-form to form the turbine component.

2. The method of claim 1, wherein the pre-form material is selected from the group consisting of:
   Ni-base superalloy, Haynes 230, stainless steels, alloys and composites with a Ni-base, Co-base, Fe-base, Ti-base, Cr-base, or Nb-base, such as a FeCrAlY metallic matrix reinforced with a W phase, present as particulate, fiber, or laminate.

3. A method for making double-wall turbine structures from pre-consolidated assemblies, comprising the steps of:
   forming a pre-form assembly including sacrificial materials;
   HIPing the preform to a cylindrical shape;
   removing the sacrificial materials; and
   ring rolling the product of the HIPing to a pre determined inner diameter.

4. The method of claim 2, wherein the inner wall material is selected from the group consisting of:
   Ni-base superalloy, Haynes 230, stainless steels, alloys and composites with a Ni-base, Co-base, Fe-base, Ti-base, Cr-base, or Nb-base, such as a FeCrAlY metallic matrix reinforced with a W phase, present as particulate, fiber, or laminate.

5. A method for making double-wall turbine structures having a hot wall and a cold wall and having both a cylindrical and a conical portion from pre-consolidated assemblies, the method comprising the steps of:
   forming a pre-form assembly including materials for the hot wall, cold wall, and ribs and sacrificial segments for maintaining cooling channels during forming of the pre-assembly and later processing;
   hot rolling the pre-forms to reduce the section dimensions;
   ring rolling the right cylinder portion of the structure;
   cutting away the excess material of the conical portion of the rolled structure;
   ring rolling the remaining section to form a cone;
   joining the cylindrical portions axially together and the cylindrical and conical portions circumferentially together and
   removing the sacrificial material to open the cooling channels.

6. The method of claim 5, wherein the material for making the turbine structures is selected from the group consisting of:
   stainless steels, alloys and composites with a Ni-base, Co-base, Fe-base, Ti-base, Cr-base, or Nb-base such as a FeCrAlY metallic matrix reinforced with a W phase, present as particulate, fiber, or laminate.

7. The method of claim 5, wherein the materials used in the hot wall, the cold wall and the rib are not required to be the same alloy.

8. The method of claim 5, wherein the material for the top face, the bottom face, and/or the joining rib of the preform is selected from the group consisting of:
   superalloy powders, such as the powders of compositions equivalent to Rene 80, Rene N4, Rene N5, Rene 142, Haynes 214, Haynes 230, or MCrAlY materials, such as NiCoCrAlY.

9. The method of claim 5, wherein, depending on the types of materials used, the structures can be ring-rolled hot, instead of cold rolled.

10. A method of producing annular structures having a hot and a cold wall, and joining ribs, for inner and outer components of the annulus, such as for jet engine turbine combustors, to net shape as an annular pre-form comprising the steps of:
    forming a pre-form assembly including materials for the hot wall, cold wall, and ribs and sacrificial segments for maintaining cooling channels during forming of the pre-assembly and later processing;
    rolling the pre-form to a required thickness and length as a flat pre-form;
    hoop-rolling the preform to a required thickness and a required length;
    welding the assembly;
    ring rolling to the pre-form to a desired inner diameter;
    ring-rolling or metal spinning the pre-form to produce the proper wall contour and
    removing the sacrificial material to open the cooling channels.

11. The method of claim 10, wherein, depending on temperatures of individual applications, the materials used are selected from the group consisting of:
    stainless steels, alloys and composites with a Ni-base, Co-base, Fe-base, Ti-base, Cr-base, or Nb-base, an example of a composite is a FeCrAlY metallic matrix reinforced with a W phase, present as particulate, fiber, or laminate.

12. The method of claim 12, wherein the materials used in the hot wall, the cold wall and the rib are not required to be the same alloy.

13. The method of claim 12, wherein the materials used in a cold wall are made of a stainless steel or Ni-base superalloy and the material used in a hot wall are made of a lower-expansion Ni-base superalloy, so that in service, thermal stresses would be reduced as compared to a monolithic hot wall/cold wall structure.

14. A method of manufacturing an annular combustor comprising the steps of:

providing a single-piece ribbed hot wall for the inner and/or outer components of an annulus, where the hot wall is provided by producing a pre-form asssembly by, canning, evacuating, and HIPing.

15. The method of claim 14 wherein the cold wall can be made integral with the hot wall.

16. The method of claim 14 wherein the hot wall is provided by producing a pre-form assembly by, canning, evacuating, and HIPing.

17. The method of claim 14 wherein the pre-form has machined channels which are filled with a sacrificial material, such as cold-rolled steel or monel.

* * * * *